(12) United States Patent
Kipley et al.

(10) Patent No.: US 11,897,423 B2
(45) Date of Patent: Feb. 13, 2024

(54) LINKAGE ASSEMBLY FOR RUNNING BOARD AND METHOD

(71) Applicant: Ford Global Technologies, LLC, Dearborn, MI (US)

(72) Inventors: Mike Kipley, Saline, MI (US); Paul Kenneth Dellock, Northville, MI (US); Stuart C. Salter, White Lake, MI (US); Peter Simeon Lazarevski, Dearborn, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 17/367,822

(22) Filed: Jul. 6, 2021

(65) Prior Publication Data
US 2023/0010767 A1   Jan. 12, 2023

(51) Int. Cl.
*B60R 3/02* (2006.01)
*B60R 3/00* (2006.01)

(52) U.S. Cl.
CPC .............. *B60R 3/002* (2013.01); *B60R 3/02* (2013.01)

(58) Field of Classification Search
CPC .................................. B60R 3/02; B60R 3/002
See application file for complete search history.

(56) References Cited

U.S. PATENT DOCUMENTS

| | | | |
|---|---|---|---|
| 7,318,596 B2 | 1/2008 | Scheuring, III et al. | |
| 10,676,033 B1* | 6/2020 | Carr | B60R 3/02 |
| 2003/0132595 A1* | 7/2003 | Fabiano | B60R 3/002 |
| | | | 280/166 |
| 2010/0194070 A1* | 8/2010 | Stauffer | B60R 3/002 |
| | | | 280/166 |
| 2020/0339039 A1* | 10/2020 | Watson | B60R 3/002 |

FOREIGN PATENT DOCUMENTS

| | | |
|---|---|---|
| CN | 110217176 A | 9/2019 |
| CN | 110303988 A | 10/2019 |
| JP | 2020152289 A | 10/2019 |

\* cited by examiner

*Primary Examiner* — Bryan A Evans
(74) *Attorney, Agent, or Firm* — Vichit Chea; Carlson, Gaskey & Olds, P.C.

(57) ABSTRACT

This disclosure relates to a running board for a motor vehicle, and in particular relates to a linkage assembly for the running board and a corresponding method of using the same. An example running board assembly includes a deck and a linkage assembly configured to guide movement of the deck. The linkage assembly includes a first link and a second link further from the deck than the first link. The second link is curved such that the second link exhibits a concave contour from a perspective of the deck.

19 Claims, 6 Drawing Sheets

LINKAGE ASSEMBLY FOR RUNNING BOARD AND METHOD

TECHNICAL FIELD

This disclosure relates to a running board for a motor vehicle, and in particular relates to a linkage assembly for the running board and a corresponding method of using the same.

BACKGROUND

Sport utility vehicles (SUVs), trucks, pickup trucks, vans, and other vehicles, such as four-wheel drive (4WD) vehicles, have a relatively high ground clearance, meaning the floor is at a relatively high elevation above the ground.

Running boards are known, and have been used to aid with entering and exiting vehicles with a high ground clearance. Running boards are also used by users when accessing items stored on the top of the vehicle. Some retractable running board assemblies (sometimes referred to as power running board assemblies or electric running board assemblies) include a running board that is moveably connected the vehicle by one or more linkages. The linkages are driven by an actuator. Together, the linkages and actuator are configured to move the running board between a retracted position (sometimes referred to as a "stowed" position) and a deployed position.

SUMMARY

A running board assembly for a motor vehicle according an exemplary aspect of the present disclosure includes, among other things, a deck and a linkage assembly configured to guide movement of the deck. The linkage assembly includes a first link and a second link further from the deck than the first link. Further, the second link is curved such that the second link exhibits a concave contour from a perspective of the deck.

In a further non-limiting embodiment of the foregoing running board assembly, the second link is substantially C-shaped.

In a further non-limiting embodiment of any of the foregoing running board assemblies, the assembly includes a first shaft and a second shaft arranged substantially parallel to the first shaft and spaced-apart from the first shaft such that the second shaft is further from the deck than the first shaft. Further, the first shaft is fixedly connected to the first link adjacent a first end of the first link, and the second shaft is fixedly connected to the second link adjacent a first end of the second link.

In a further non-limiting embodiment of any of the foregoing running board assemblies, the assembly includes a body-mounting bracket configured to fixedly connect to a body of the motor vehicle, and the first and second shafts pass through the body-mounting bracket.

In a further non-limiting embodiment of any of the foregoing running board assemblies, the assembly includes a deck-mounting bracket connected to the first link adjacent a second end of the first link opposite the first end of the second link, and further connected to the second link adjacent a second end of the second link opposite the first end of the second link.

In a further non-limiting embodiment of any of the foregoing running board assemblies, the deck-mounting bracket is connected to the first link such that the deck-mounting bracket is able to rotate relative to the first link without sliding, and the deck-mounting bracket is connected to the second link such that the deck-mounting bracket is able to rotate and slide relative to the second link.

In a further non-limiting embodiment of any of the foregoing running board assemblies, the second end of the first link includes a cylindrical through-bore receiving a first pin connected to the deck-mounting bracket, and the second end of the second link includes a rectangular through-bore receiving a second pin connected to the deck-mounting bracket.

In a further non-limiting embodiment of any of the foregoing running board assemblies, a first bushing is arranged in the cylindrical through-bore, and a second bushing is arranged in the rectangular through-bore.

In a further non-limiting embodiment of any of the foregoing running board assemblies, the first and second bushings are made of ultra-high-molecular-weight-polyethylene (UHMWPE).

In a further non-limiting embodiment of any of the foregoing running board assemblies, the assembly includes a motor configured to rotate the first shaft to adjust a position on the deck.

In a further non-limiting embodiment of any of the foregoing running board assemblies, the assembly includes a controller configured to issue instructions to the motor, and the motor is responsive to instructions from the controller.

In a further non-limiting embodiment of any of the foregoing running board assemblies, the motor is configured to adjust a position of the deck between a stowed position and a plurality of deployed positions. Further, in each deployed position, the deck is at a different height from a ground surface relative to each of the other deployed positions.

In a further non-limiting embodiment of any of the foregoing running board assemblies, the plurality of deployed positions includes three deployed positions.

In a further non-limiting embodiment of any of the foregoing running board assemblies, in each of the plurality of deployed positions, the deck is substantially parallel to a ground surface.

In a further non-limiting embodiment of any of the foregoing running board assemblies, the assembly includes a sensor configured to obtain information pertaining to a height of a user, and the controller is configured to issue an instruction to the motor to move the deck to a particular one of the plurality of deployed positions based on the information from the sensor pertaining to the height of the user.

In a further non-limiting embodiment of any of the foregoing running board assemblies, the controller is configured to instruct the motor to move the deck to a highest position relative to a ground surface in response to a cargo access command and regardless of the information from the sensor pertaining to the height of the user.

In a further non-limiting embodiment of any of the foregoing running board assemblies, in the stowed position, the deck is beneath a body of the motor vehicle and does not project laterally outward of the body of the motor vehicle.

A method according to an exemplary aspect of the present disclosure includes, among other things, moving a deck of a running board to one of a plurality of deployed positions based on either a height of a user or a cargo access command. Further, movement of the deck is guided by a linkage assembly including a first link and a second link further from the deck than the first link. The second link is curved such that the second link exhibits a concave contour from a perspective of the deck.

In a further non-limiting embodiment of the foregoing method, the second link is substantially C-shaped.

In a further non-limiting embodiment of any of the foregoing methods, the plurality of deployed positions includes three deployed positions, in each deployed position, the deck is at a different height from a ground surface relative to each of the other deployed positions, depending on a height of the user, the deck is moved to a deployed position corresponding to a height of the user, and, in response to a cargo access command, the deck is moved to a deployed position furthest from the ground surface regardless of the height of the user.

DETAILED DESCRIPTION

This disclosure relates to a running board for a motor vehicle, and in particular relates to a linkage assembly for the running board and a corresponding method of using the same. An example running board assembly includes a deck and a linkage assembly configured to guide movement of the deck. The linkage assembly includes a first link and a second link further from the deck than the first link. The second link is curved such that the second link exhibits a concave contour from a perspective of the deck. Among other benefits, the disclosed running board accommodates users of various heights while also permitting cargo access. Further, the linkage assembly, and in particular the curved nature of one of the second link, permits additional travel of the running board assembly relative to known assemblies.

Figure 1:
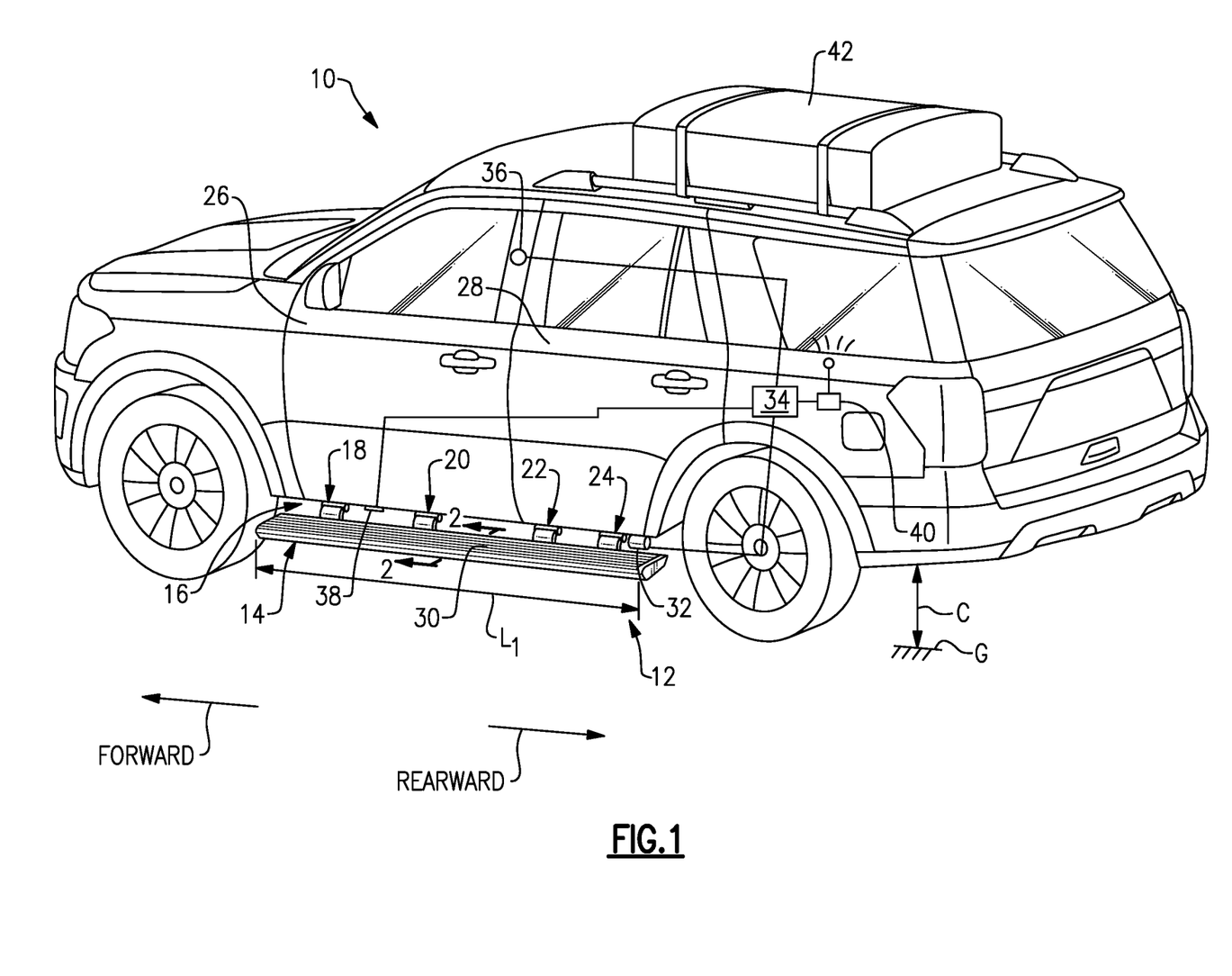
FIG. 1 is a perspective view of a motor vehicle with an example running board assembly.

Referring to the drawings, FIG. 1 is a rear-perspective view of a motor vehicle 10. The vehicle 10 has a relatively high clearance C, which is a distance between a ground surface G and a floor of the vehicle 10. As shown, the vehicle 10 is a sport utility vehicle (SUV). While an SUV is pictured, this disclosure is also applicable to other types of vehicles having a high ground clearance, such as vans and trucks.

The vehicle 10 includes a retractable running board assembly 12 moveable from a retracted, or stowed, position to a plurality of deployed positions. The deployed positions may be referred to as use positions in which the running board assembly 12 is useable by a user, such that a user may step on a deck of a running board 14. The running board assembly 12 is shown in a deployed position in FIG. 1. In this example, the running board assembly 12 includes the running board 14 and linkage assembly 16 configured to guide movement of the running board 14 between the stowed and deployed positions.

The linkage assembly 16 includes four sub-assemblies 18, 20, 22, 24 in this example. The sub-assemblies 18, 20, 22, 24 are spaced-apart from one another along a length $L_1$ of the running board 14. The sub-assemblies 18, 20, 22, 24 may each be referred to as a linkage assembly. While four sub-assemblies 18, 20, 22, 24 are shown, the linkage assembly 16 may include one or more sub-assemblies. The linkage assembly 16 is shown schematically in FIG. 1, and a more detailed example of the linkage assembly 16 will be described below.

The running board 14 has a length $L_1$ that extends in a direction parallel to the "forward" and "rearward" directions, which are labeled in FIG. 1 and correspond to the normal "forward" and "rearward" orientations of the vehicle 10. The running board 14 in this example spans at least a majority of the widths of a front door 26 and a rear door 28 of the vehicle 10. While only one running board 14 is shown in FIG. 1, it should be understood that a similar running board may be provided on an opposite side of the vehicle 10.

When in one of the deployed positions, a user may step on the running board 14 as they enter and exit the vehicle 10. Specifically, the user may step on a deck 30 (or, step pad or stepping platform) of the running board 14, which in this example provides the uppermost surface of the running board 14.

In this example, a motor 32 is mounted adjacent the sub-assembly 24. The motor 32 is configured to adjust a position of the running board 14 between the retracted and deployed positions. In one example, the motor 32 is in communication with a controller 34, which instructs the motor 32 to move the running board 14 between the retracted and deployed positions based on a number of factors, including whether the doors 26, 28 are opened or closed, based on a height of a user, and/or based on whether a user provides a cargo access command.

The controller 34 is shown schematically in FIG. 1. It should be understood that the controller 34 could be part of an overall vehicle control module, such as a vehicle system controller (VSC), or could alternatively be a stand-alone controller separate from the VSC. Further, the controller 34 may be programmed with executable instructions for interfacing with and operating the various components of the vehicle 10. The controller 34 may be operable in response to signals from a key fob, a vehicle infotainment system, or a mobile device of a user, for example. The controller 34 additionally includes a processing unit and non-transitory memory for executing the various control strategies and modes of the vehicle system.

In one example, the motor 32 is an electric motor, and is responsive to instructions from the controller 34 to selectively to adjust a position of the linkage assembly 16, and in turn the running board 14 and the deck 30.

The vehicle 10, in this example, includes a plurality of sensors which provide information useable by the controller 34 in adjusting a position of the running board 14. In an example, the vehicle 10 includes an image sensor 36, which may be a camera, mounted such that the image sensor 36 is able to capture still images or video of a user adjacent a side of the vehicle 10. The controller 34 may use this information to determine a height of a user. The controller 34 may then move the running board 14 to a particular deployed position corresponding to a height of the user.

In an example, when the user is relatively short, such as less than 5' 4" in height, the running board 14 is set to a relatively low height, meaning a relatively small distance between the running board 14 and the ground surface, such that the user can readily step on the deck 30. When the user is of a mid-height, such as between 5' 4" and 6' 0", the running board 14 is set to a mid-height from the ground surface. When the user is relatively tall, such as greater than 6' 0" in height, the running board 14 is set to a maximum distance from the ground surface. In other words, the controller 34 uses the information from the image sensor 36 to set the running board 14 to a deployed position corresponding to a height of the user. In this regard, the running board 14 is moveable to three distinct deployed positions, each having a different height relative to the ground surface relative to the other deployed positions. In each deployed position, the linkage assembly 16 is configured such that the deck 30 is substantially parallel to an adjacent ground surface G.

Another sensor includes an image sensor 38 mounted to a body of the vehicle 10 and configured to generate still images or video useable by the controller 34 to determine a position of the deck 30 of the running board 14 relative to the ground surface G and/or relative to a body of the vehicle 10.

The vehicle 10 also includes a transceiver 40 configured to receive signals from a key fob, a keypad on the door 26 (for example), a mobile device of a user (i.e., using the phone as a key, sometimes abbreviated PAAK), or a button within the vehicle 10. The transceiver 40, in particular, may receive a cargo access command. In response to the cargo access command, the controller 34 instructs the motor 32 to move the running board 14 to the highest deployed position, which in an example is a position corresponding to a user over 6' 0" in height. In response to the cargo access command, the controller 34 does not adjust the running board 14 based on information from the sensor 36. In other words, in response to the cargo access command, the controller 34 instructs the motor 32 to move the running board 14 to the highest deployed position regardless of a height of the user. As such, in response to the cargo access command, the running board 14 is positioned such that a user is better able to access a top of the vehicle, which may contain cargo 42 such as luggage, canoes, bicycles, skis, etc.

Figure 2:
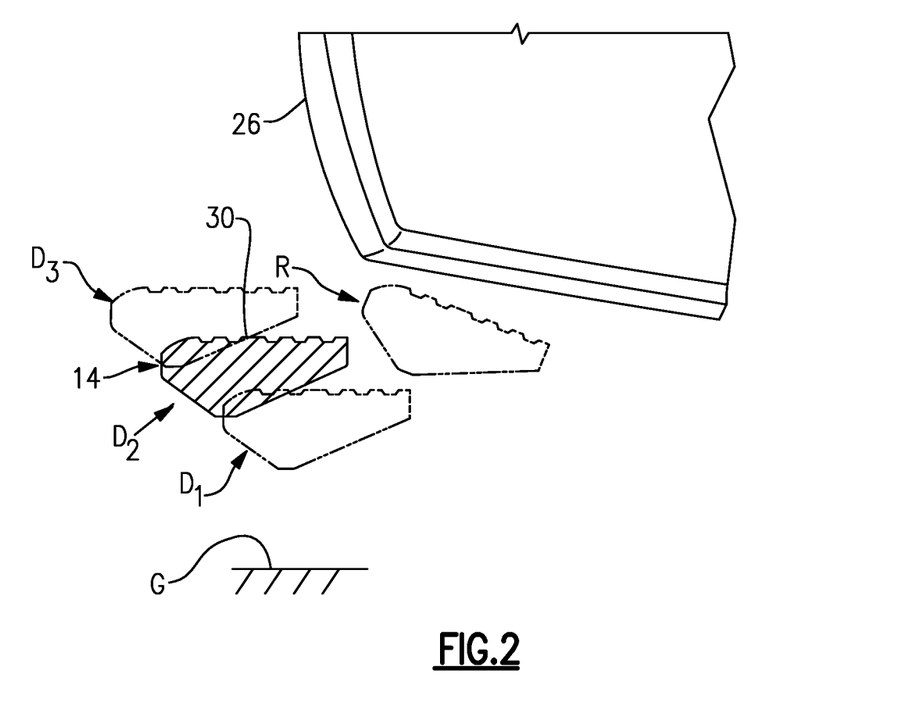
FIG. 2 is a cross-sectional view taken along line 2-2 and illustrates the running board in four example positions.

FIG. 2 is a somewhat schematic cross-sectional view of the running board 14 taken along line 2-2 and illustrates four example positions of the running board 14 relative to the door 26. As represented in FIG. 2, the running board 14 is moveable between a retracted position R (shown in phantom) and three deployed positions $D_1$-$D_3$. In the retracted position R, the deck 30 is beneath the body of the motor vehicle 10 and does not project laterally outward beyond the body of the motor vehicle 10. In the retracted position R, the running board 14 is essentially tucked under a lower surface of the door 26 to protect the running board 14 while the vehicle 10 is in motion, for example.

A first deployed position $D_1$ is a low height position in which the deck 30 of the running board 14 is closest to the ground surface G. A second deployed position $D_2$ is a mid-height position. A third deployed position $D_3$ is a maximum height position in which the deck 30 is at its highest height relative to the ground surface G. In FIG. 2, the running board 14 is in the second deployed position $D_2$ in which the deck 30 is arranged at a height above the ground surface G between the heights associated with the first and third deployed positions $D_1$, $D_3$.

When the vehicle 10 is stationary, the motor 32 is configured to drive the running board 14 under instructions from the controller 34 to one of the deployed positions $D_1$-$D_3$. In each of the deployed positions $D_1$-$D_3$, the deck 30 of the running board 14 is substantially parallel to a ground surface G. Thus, the running board 14 may support a user in each of the deployed positions $D_1$-$D_3$. In the second deployed position $D_2$, the running board 14 displaced further laterally (i.e., to the left-hand side, relative to FIG. 2) from a body of a vehicle 10 relative to the first deployed position $D_1$. Further, in the third deployed position $D_3$, the running board 14 is displaced further laterally from the body of the vehicle than in second deployed position $D_2$. The third deployed position $D_3$ facilitates cargo access.

While a four-position (i.e., retracted/stowed, first deployed, second deployed, and third deployed positions) running board assembly is shown in the figures, it should be understood that this disclosure extends to running board assemblies that are moveable to another number of positions.

In this disclosure, the running board assembly 12 is configured to hold the running board 14 in the deployed position by actively monitoring the position of the running board 14, using sensor 38, and applying torque to the motor 32 as necessary to maintain the position. If a user is standing on the running board 14 for a period of time such that a thermal breaker of the motor 32 is about to trip, an alert, such as an audible and/or visual alert, may be be presented to the user asking the user to step off the running board 14. In this regard, the vehicle 10 may include a speaker or sound exciter configured to issue the alert. When holding one of the stowed or deployed positions, a torque limit of the motor 32 may be overridden for a period of time. Optionally, the motor 32 may include a brake configured to selectively lock the motor 32, and in turn the running board 14, in a desired one of the stowed or deployed positions.

Figure 3:
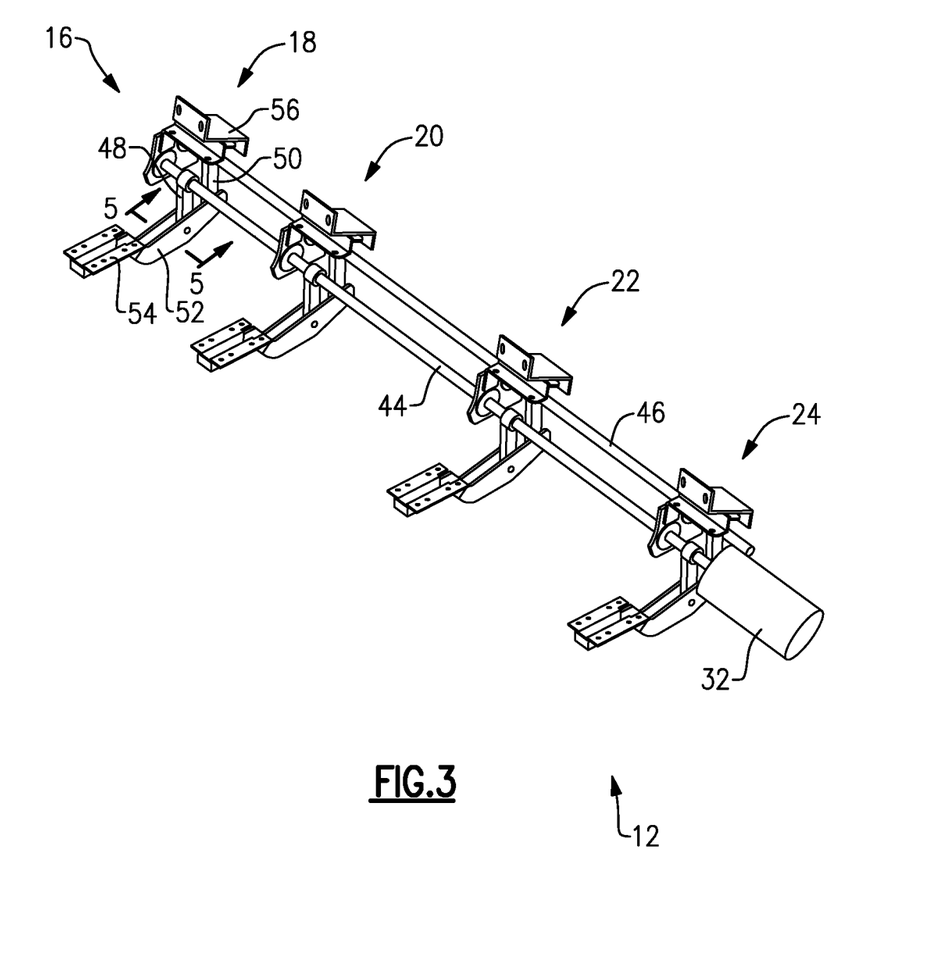
FIG. 3 is a perspective view illustrating some components of the running board assembly in more detail, including showing additional detail of a linkage assembly.

FIG. 3 illustrates some components of the running board assembly 12 in more detail. With respect to the motor 32, it is connected directly to a first shaft 44. Rotation of the motor 32 results in rotation of the first shaft 44. A second shaft 46 is spaced-apart from the first shaft 44. The second shaft 46 is not directly mounted to the motor 32, in this example, but is passively rotatable by virtue of its indirect connection to the motor 32, as will be appreciated.

The first shaft 44 is closer to the deck 30 than the second shaft 46. The first and second shafts 44, 46 are parallel to one another and exhibit a length substantially equal to the length $L_1$ of the running board 14.

In FIG. 3, each of the sub-assemblies 18, 20, 22, 24 are arranged similarly. Detail of the sub-assembly 18 will now be described. The sub-assemblies 20, 22, 24 are configured in the same manner.

The sub-assembly 18 includes a first link 48 and a second link 50. The first link 48 is connected, adjacent one end, to the first shaft 44 and, adjacent an opposite end, to a deck-mounting bracket 52. The second link 50 is connected, adjacent one end, to the second shaft 46 and, adjacent an opposite end, to the deck-mounting bracket 52. Adjacent an end opposite the first and second links 48, 50, the deck-mounting bracket 52 includes a pad 54 configured to attach to an underside of the running board 14.

The first and second shaft 44, 46 pass through a body-mounting bracket 56. Bushings may be used to reduce friction between the first and second shafts 44, 46, which are rotatable relative to the body-mounting bracket 56. When present, the bushings may be cylindrical and may be made of ultra-high-molecular-weight-polyethylene (UHMWPE), which is self-lubricating and does not require application of lubricant to facilitate rotation of the first and second shaft 44, 46. The body-mounting bracket 56 is configured to fixedly connect directly to a body of the vehicle 10.

Figure 4:
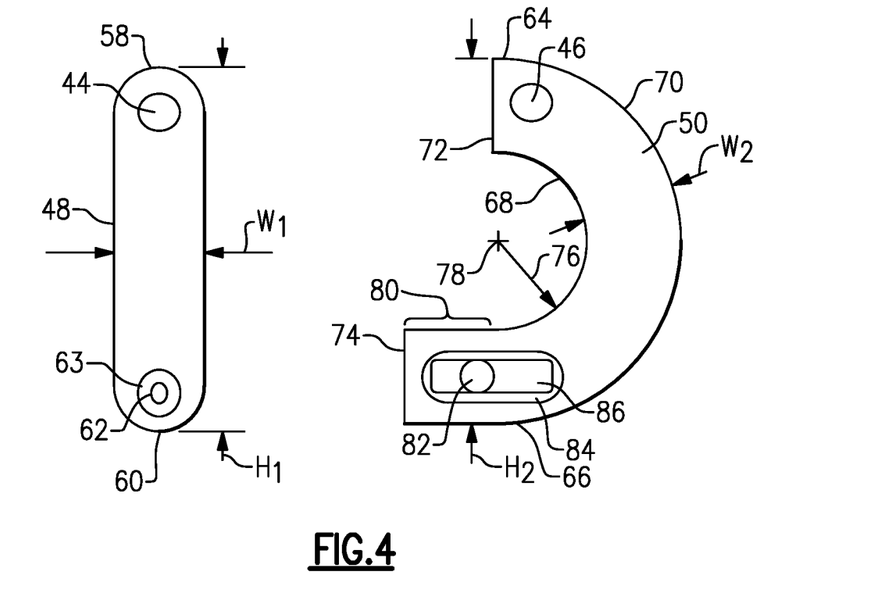
FIG. 4 is a side view of two example links.

The first and second links 48, 50 are illustrated in more detail in FIG. 4. The first link 48 is configured as a straight rod exhibiting a height $H_1$ between a first end 58 and a second end 60. The first link 48 exhibits a constant width $W_1$ over a majority of its height $H_1$, with the exception of rounding adjacent the first and second ends 58, 60. As shown in FIG. 4, the first link 48 is connected to the first shaft 44 adjacent the first end 58. In this example, the first link 48 is fixedly connected, such as by welding, to the first shaft 44 such that rotation of the first shaft 44 results in corresponding rotation of the first link 48. Adjacent the second end 60, the first link 48 is rotatably connected to the deck-mounting bracket 52 via a pin 62 and cylindrical bushing 63 arranged in a cylindrical through-bore of the first link 48. As above, the bushing 63 may be made of UHMWPE. While rotation between the first link 48 and deck-mounting bracket 52 is permitted via the pin 62, sliding is not permitted.

With respect to the second link 50, it is shaped differently than the first link 48. In this example, the second link 50 is shaped such that the second link 50 exhibits a concave contour from the perspective of the deck 30 (i.e., from a perspective of the left-hand side of the page, relative to FIG. 4). The second link 50 is substantially C-shaped. The second link 50 exhibits a height $H_2$, between upper edge 64 and lower edge 66, and a width $W_2$, between a first side 68 and a second side 70. The height $H_2$ and width $W_2$ are substantially the same as the height $H_1$ and width $W_2$, respectively. The length of the second link 50, however, is not coextensive with its height $H_2$, contrary to the first link 48. The second link 50 exhibits a length between a first end 72 and a second end 74 greater than the height $H_2$. In this example, beginning at the first end, the second link 50 follows a radius 76 having an origin 78 on a side of the second link 50 facing the first link 48. After following the radius for 180° about the origin 78, adjacent the second end 74, the second link 50 ceases following the radius 76 and exhibits a straight section 80 following a tangent to the radius 76. The straight section 80 leads directly to the second end 74.

Adjacent the first end 72, the second link 50 is fixedly connected, such as by welding, to the second shaft 46 such that rotation of second link 50 results in rotation of the second shaft 46, and vice versa. Adjacent the second end 74, the second link 50 is both rotatably and slideably connected to the deck-mounting bracket 52 via a pin 82 and bushing 84. As above, the bushing 84 may be made of UHMWPE. The bushing 84 is received in a rectangular through-bore 86 of the second link 50. The bushing 84 exhibits a shape corresponding to the rectangular through-bore 86. The rectangular shape of the through-bore 86 permits the pin 82 to slide along the through-bore 86, which is beneficial in maintaining an orientation of the deck 30 that is parallel to the ground surface G in each of the deployed positions $D_1$-$D_3$.

Figure 5:
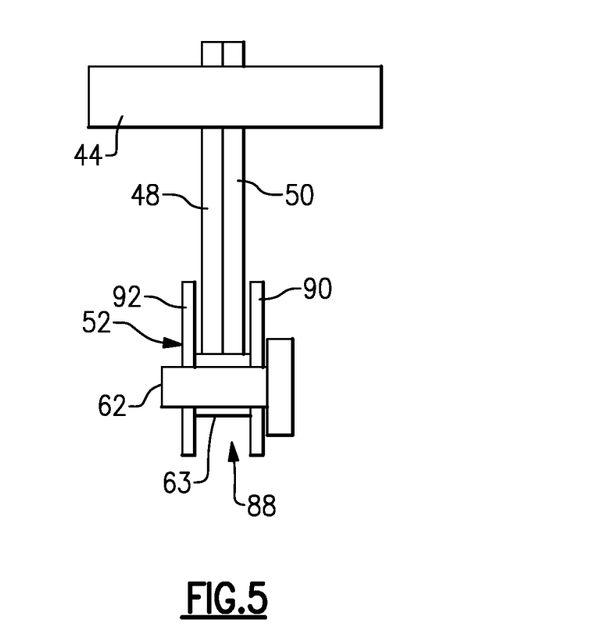
FIG. 5 is a view of an example link arrangement from a perspective of a deck of the running board assembly.

FIG. 5 illustrates an example arrangement of the first link 48 relative to the first shaft 44 and the deck-mounting bracket 52. As shown, the first link 48 is arranged in a gap 88 between side walls 90, 92 of the deck-mounting bracket 52. The pin 62 passes through the deck-mounting bracket 52. The pin 62 may be attached to the deck-mounting bracket 52 using a cotter pin or another type of connection. When viewed from a perspective of the deck 30, as in FIG. 5, the second link 50 may be visible. In this regard, to prevent interference between the two links 48, 50, the first and second links 48, 50 may be slightly offset from one another along a length $L_1$ of the running board 14. In FIG. 5, both links 48, 50 are arranged in the gap 88.

Figure 6:
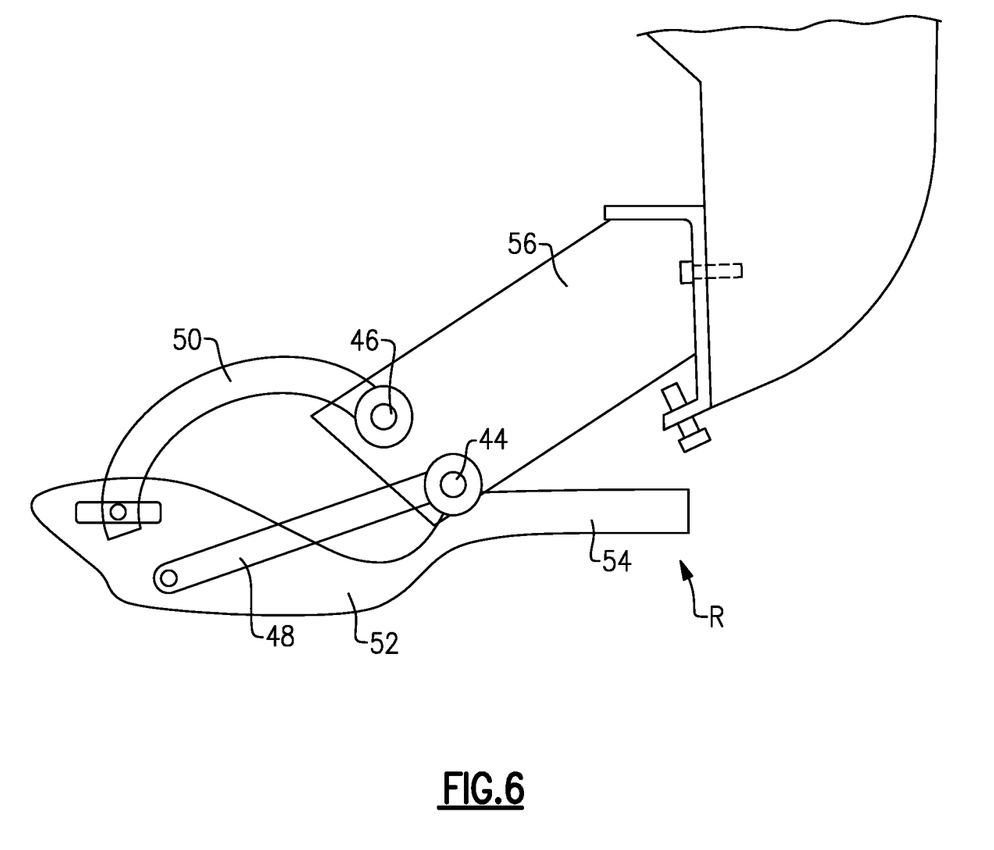
FIG. 6 is a side view of the running board assembly in a stowed position.
Figure 7:
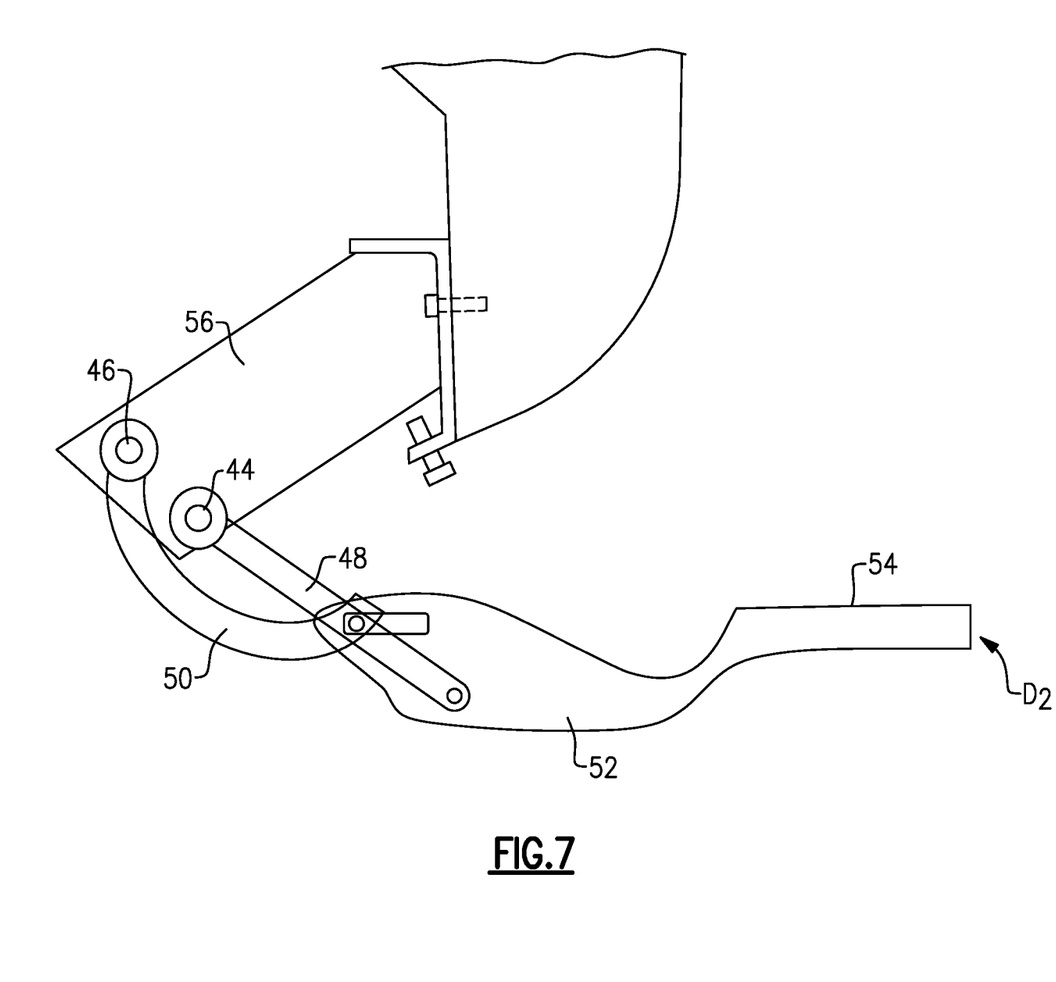
FIG. 7 is a side view of the running board assembly in an example deployed position.

FIGS. 6 and 7 illustrate some components of the running board assembly 12 in the retracted position R (FIG. 6) and a second deployed position $D_2$ (FIG. 7). As shown, the concave contour of the second link 50 prevents interference between the second link 50 and the first shaft 44 in the second deployed position. If the second link 50 were straight, the second link 50 would contact the first shaft 44 and prevent movement of the running board 14 to the second deployed position $D_2$, and to any positions exhibiting a greater height relative to the ground surface G, such as the third deployed position $D_3$. FIGS. 6 and 7 are representative of a situation in which a user approaches the stationary vehicle 10, and, based on the information from the sensor 36, the controller 34 determines that the user is of a mid-height, such as 5' 11". As such, the controller 34 instructs the motor 32 to rotate the first shaft 44 such that the running board 14 moves from the retracted position R (FIG. 6) to the second deployed position $D_2$ (FIG. 7).

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A running board assembly for a motor vehicle, comprising:
   a deck;
   a linkage assembly configured to guide movement of the deck, wherein the linkage assembly includes a first link and a second link further from the deck than the first link, and wherein the second link is curved such that the second link exhibits a concave contour from a perspective of the deck;
   a first shaft;
   a second shaft arranged substantially parallel to the first shaft and spaced-apart from the first shaft such that the second shaft is further from the deck than the first shaft, wherein the first shaft is fixedly connected to the first link adjacent a first end of the first link, and wherein the second shaft is fixedly connected to the second link adjacent a first end of the second link; and
   a deck-mounting bracket connected to the first link adjacent a second end of the first link opposite the first end of the second link, and further connected to the second link adjacent a second end of the second link opposite the first end of the second link, wherein the deck-mounting bracket is connected to the first link such that the deck-mounting bracket is able to rotate relative to the first link without sliding, and wherein the deck-mounting bracket is connected to the second link such that the deck-mounting bracket is able to rotate and slide relative to the second link.

2. The running board assembly as recited in claim 1, wherein the second link is substantially C-shaped.

3. The running board assembly as recited in claim 1, further comprising:
a body-mounting bracket configured to fixedly connect to a body of the motor vehicle, and
wherein the first and second shafts pass through the body-mounting bracket.

4. The running board assembly as recited in claim 1, wherein:
the second end of the first link includes a cylindrical through-bore receiving a first pin connected to the deck-mounting bracket, and
the second end of the second link includes a rectangular through-bore receiving a second pin connected to the deck-mounting bracket.

5. The running board assembly as recited in claim 4, wherein:
a first bushing is arranged in the cylindrical through-bore, and
a second bushing is arranged in the rectangular through-bore.

6. The running board assembly as recited in claim 5, wherein the first and second bushings are made of ultra-high-molecular-weight-polyethylene (UHMWPE).

7. The running board assembly as recited in claim 1, further comprising:
a motor configured to rotate the first shaft to adjust a position on the deck.

8. The running board assembly as recited in claim 1, wherein the first and second links are connected to the deck via the deck-mounting bracket.

9. The running board assembly as recited in claim 7, further comprising:
a controller configured to issue instructions to the motor, and
wherein the motor is responsive to instructions from the controller.

10. The running board assembly as recited in claim 9, wherein:
the motor is configured to adjust a position of the deck between a stowed position and a plurality of deployed positions, and
in each deployed position, the deck is at a different height from a ground surface relative to each of the other deployed positions.

11. The running board assembly as recited in claim 10, wherein the plurality of deployed positions includes three deployed positions.

12. The running board assembly as recited in claim 10, wherein, in each of the plurality of deployed positions, the deck is substantially parallel to a ground surface.

13. The running board assembly as recited in claim 11, further comprising:
a sensor configured to obtain information pertaining to a height of a user, and
wherein the controller is configured to issue an instruction to the motor to move the deck to a particular one of the plurality of deployed positions based on the information from the sensor pertaining to the height of the user.

14. The running board assembly as recited in claim 13, wherein the controller is configured to instruct the motor to move the deck to a highest position relative to a ground surface in response to a cargo access command and regardless of the information from the sensor pertaining to the height of the user.

15. The running board assembly as recited in claim 11, wherein, in the stowed position, the deck is beneath a body of the motor vehicle and does not project laterally outward of the body of the motor vehicle.

16. A method, comprising:
moving a deck of a running board to one of a plurality of deployed positions based on either a height of a user or a cargo access command, wherein movement of the deck is guided by a linkage assembly including a first link and a second link further from the deck than the first link, and wherein the second link is curved such that the second link exhibits a concave contour from a perspective of the deck, wherein a first shaft is fixedly connected to the first link adjacent a first end of the first link, wherein a second shaft is fixedly connected to the second link adjacent a first end of the second link, wherein a deck-mounting bracket is connected to the first link adjacent a second end of the first link opposite the first end of the second link, and wherein the deck-mounting bracket is further connected to the second link adjacent a second end of the second link opposite the first end of the second link, wherein the deck-mounting bracket is connected to the first link such that the deck-mounting bracket is able to rotate relative to the first link without sliding, and wherein the deck-mounting bracket is connected to the second link such that the deck-mounting bracket is able to rotate and slide relative to the second link.

17. The method as recited in claim 16, wherein the second link is substantially C-shaped.

18. The method as recited in claim 16, wherein:
the plurality of deployed positions includes three deployed positions,
in each deployed position, the deck is at a different height from a ground surface relative to each of the other deployed positions,
depending on a height of the user, the deck is moved to a deployed position corresponding to a height of the user, and
in response to a cargo access command, the deck is moved to a deployed position furthest from the ground surface regardless of the height of the user.

19. The method as recited in claim 16, wherein the first and second links are connected to the deck via the deck-mounting bracket.

* * * * *